US010837383B2

United States Patent
Agnus et al.

(10) Patent No.: US 10,837,383 B2
(45) Date of Patent: Nov. 17, 2020

(54) METHOD FOR ESTIMATING A TOP DEAD CENTRE FOR A HIGH-PRESSURE PUMP OF A FUEL INJECTION SYSTEM IN AN AUTOMOTIVE VEHICLE ENGINE

(71) Applicants: CONTINENTAL AUTOMOTIVE FRANCE, Toulouse (FR); CONTINENTAL AUTOMOTIVE GmbH, Hannover (DE)

(72) Inventors: Yves Agnus, Toulouse (FR); Nicolas Girard, Carbonne (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/470,023

(22) PCT Filed: Dec. 12, 2017

(86) PCT No.: PCT/FR2017/053516
§ 371 (c)(1),
(2) Date: Jun. 14, 2019

(87) PCT Pub. No.: WO2018/109359
PCT Pub. Date: Jun. 21, 2018

(65) Prior Publication Data
US 2019/0353110 A1 Nov. 21, 2019

(30) Foreign Application Priority Data

Dec. 15, 2016 (FR) ...................................... 16 62526

(51) Int. Cl.
*F02D 41/38* (2006.01)
*F02D 41/00* (2006.01)
(Continued)

(52) U.S. Cl.
CPC ......... *F02D 41/009* (2013.01); *F02D 19/023* (2013.01); *F02D 41/3854* (2013.01);
(Continued)

(58) Field of Classification Search
CPC .............. F02D 41/009; F02D 41/3854; F02D 41/3845; F02D 19/023; F02D 2250/31;
(Continued)

(56) References Cited

U.S. PATENT DOCUMENTS 7,789,068 B2 * 9/2010 Serra ................... F02D 41/3854
123/446
2010/0132670 A1 * 6/2010 Okamoto ............. F02M 59/366
123/458

(Continued)

FOREIGN PATENT DOCUMENTS

DE 102010030447 A1 12/2011
DE 102014219459 A1 4/2015
(Continued)

OTHER PUBLICATIONS

International Search Report (ISR), dated Feb. 7, 2018, from corresponding international application No. PCT/FR2017/053516.

*Primary Examiner* — Hai H Huynh
(74) *Attorney, Agent, or Firm* — Nixon & Vanderhye (57) ABSTRACT

Disclosed is a method for estimating an angular position of top dead center for a high-pressure fuel injection pump that forms part of a system for injecting fuel into a motor vehicle engine, the pump including at least one piston moving in a chamber between the top and the bottom dead center, the pump being equipped with a digital control valve for controlling a quantity of fuel, an electrical current being applied to the digital valve as it closes then removed in order to open the digital valve, a movement of the digital valve in the direction of opening creating an induced current which
(Continued)

makes it possible to detect a position of start-of-opening of the digital valve. An instant at which the pump piston passes through top dead center is estimated as a function of an instant at which the position of start-of-opening of the digital valve appears.

20 Claims, 5 Drawing Sheets

(51) Int. Cl.
    *F02D 19/02* (2006.01)
    *F02M 59/20* (2006.01)
    *F02M 59/36* (2006.01)
    *G01B 7/30* (2006.01)

(52) U.S. Cl.
    CPC ........ *F02M 59/205* (2013.01); *F02M 59/368* (2013.01); *G01B 7/30* (2013.01); *F02D 2200/0602* (2013.01); *F02D 2200/0606* (2013.01); *F02D 2250/31* (2013.01)

(58) Field of Classification Search
    CPC ..... F02D 2200/0602; F02D 2200/0606; G01B 7/30; F02M 59/368; F02M 59/205
    USPC ....... 123/364, 379, 445, 446, 457, 458, 459, 123/495, 496, 497, 498, 499, 510, 511
    See application file for complete search history.

(56) References Cited

U.S. PATENT DOCUMENTS

| | | |
|---|---|---|
| 2014/0216419 A1 | 8/2014 | Wirkowski et al. |
| 2015/0090227 A1 | 4/2015 | Pursifull et al. |
| 2015/0337783 A1 | 11/2015 | Pursifull et al. |

FOREIGN PATENT DOCUMENTS

| | | |
|---|---|---|
| EP | 1873382 A2 | 1/2008 |
| JP | 2014001738 A | 1/2014 |

\* cited by examiner

METHOD FOR ESTIMATING A TOP DEAD CENTRE FOR A HIGH-PRESSURE PUMP OF A FUEL INJECTION SYSTEM IN AN AUTOMOTIVE VEHICLE ENGINE

The invention relates to a method for estimating an angular position of top dead center for a high-pressure fuel injection pump that forms part of a system for injecting fuel into a motor vehicle internal combustion engine. This estimation method is used in a method for synchronizing a high-pressure fuel injection pump with the internal combustion engine of the vehicle.

In this method for estimating an angular position of top dead center of a high-pressure fuel injection pump, the pump comprises at least one piston moving in a pump chamber between a top dead center for which a volume of the chamber is at its smallest and a bottom dead center for which the volume of the chamber is at its greatest.

BACKGROUND OF THE INVENTION

In the conventional way, a system for injecting fuel into an internal combustion engine comprises a low-pressure fuel tank, a booster pump, a high-pressure fuel injection pump fed by the booster pump, a high-pressure fuel injection pump controller, means for activating the high-pressure fuel injection pump using time-based control or angular control, using the high-pressure fuel injection pump controller and a control unit.

The fuel injection system also comprises a common rail, acting as a high-pressure fuel reservoir, fed by said high-pressure fuel injection pump, means for measuring the pressure in the common rail, injectors supplied with fuel by said common rail and controlled by the control unit to inject the fuel into the cylinders of the internal combustion engine. The high-pressure fuel injection pump is driven by the internal combustion engine.

In such a high-pressure fuel supply system, the fuel is transferred from the low-pressure fuel tank to the high-pressure fuel injection pump by means of the booster pump which operates at low pressure. The pressure of the fuel in the common rail is regulated by means of a PID (proportional, integral, derivative) controller, referred to as the high-pressure fuel injection pump controller.

This controller acts in combination with an actuator with which the high-pressure fuel injection pump is equipped, which makes it possible to transfer only as much fuel into the common rail as is necessary according to the amount of fuel required by the engine control unit. In order to do that, this actuator comprises a valve referred to as a DIV valve, or Digital Inlet Valve, that allows the desired quantity of fuel to be transferred into the common rail.

The actuator allows any fuel displaced by the high-pressure fuel injection pump and not wanted in the common rail to be sent back to the supply circuit. The high-pressure fuel injection pump is for example a rotary piston pump that is continuously driven in rotation by the internal combustion engine.

In what follows, the DIV valve will be referred to as a digital valve and its actuator comprising a DIV valve may be referred to hereinafter as a digital valve actuator.

The high-pressure fuel injection pump is subject to timing between the one or more pistons thereof and the pistons of the internal combustion engine driving it, for example between a top dead center position of a piston of the engine and a top dead center position of a piston of the high-pressure fuel injection pump, so as to make it possible to control the exact amount of fuel transferred into the common rail with respect to the position of the crankshaft. The digital valve actuator is activated by means of an electrical angular control, hereinafter referred to by extension as the high-pressure fuel injection pump angular control, this control being effected with respect to a reference angle, namely control effected at a precise angle of a high-pressure fuel injection pump rotating shaft.

This reference angle corresponds by construction to a position of the piston(s) of said pump, so that the digital valve closes at a precise position of the piston(s) of this high-pressure fuel injection pump that corresponds to a determined volume of fuel that is to be transferred into the common rail.

According to the prior art, the reference angle is generally established at the top dead center point of the high-pressure fuel injection pump and defined by calibration. The timing of the high-pressure fuel injection pump is set by means of an initial calibration of the reference angle and then by learning this reference angle to account for the assembly and sensor tolerances, in particular in the present case of the high-pressure fuel injection pump and the mechanism via which it is driven by the combustion engine.

If the timing of the high-pressure fuel injection pump is incorrect, the quantity of fuel transferred into the common rail is also incorrect, and consequently so is the pressure established in this rail.

Still according to the prior art, the timing of the high-pressure fuel injection pump is therefore subject to learning based, in a known manner, on the detection of the integral portion of the PID controller or regulator, in a certain angular window, by varying the theoretical position of the top dead center (TDC) of the high-pressure fuel injection pump. This learning of the timing is performed by the control unit. As an alternative, the pressure signal in the rail can be analyzed.

The electrical control of the digital valve actuator is therefore calibrated so that the electric pulse is positioned at the time of desired closure of the digital valve with respect to the position of the piston(s) of the high-pressure fuel injection pump, so that the quantity of fuel determined by the engine control unit is transferred to the common rail. This electrical control of course requires knowledge of the reference angle which is established as explained above. The sequencing of the electrical control is defined during development. Such angular control of course requires the synchronization of the engine.

The high-pressure fuel injection pump is able to be driven by the internal combustion engine.

In order to be controlled with precision, high-pressure pumps need to have timing that is precisely known. This timing is generally performed mechanically in the engine timing, notably using pinions, keys and toothed belt. Nevertheless, uncertainties associated with the tolerances on all these components still remain. This is the purpose of the learning mentioned above.

The learning solutions proposed by the prior art generally require for the engine to be already running and running in a manner that is stable enough to validate the measurement over a plurality of repeat occurrences. That may present a performance problem when first starting the engine.

In addition, in the event of an injector malfunctioning or indeed in the event of a leak, the proposed learning methods do not converge on the true pump timing, and this may reduce the performance of the injection system.

The problem underlying the present invention is, for a high-pressure pump in a motor vehicle internal combustion engine fuel injection system, to achieve timing of the high-pressure pump with respect to the internal combustion engine by estimating the top dead center of the high-pressure pump.

SUMMARY OF THE INVENTION

To this end, the present invention relates to a method for estimating an angular position of top dead center for a high-pressure fuel injection pump that forms part of a system for injecting fuel into a motor vehicle internal combustion engine, the pump comprising at least one piston moving in a chamber of the pump between a top dead center for which the volume of the chamber is at its smallest and the bottom dead center for which the volume of the chamber is at its greatest, the pump being equipped with a digital control valve for controlling the quantity of fuel, this valve being commanded electrically between an open position in which a high-pressure part of the injection system is not supplied with fuel and a closed position in which the high-pressure part of the injection system is supplied with the digital valve then being in a fully closed position, an electrical current being applied to the digital valve as it closes then removed in order to open the digital valve, a movement of the digital valve toward its open position creating an induced current which, when its profile over time is monitored, makes it possible to detect a position of start-of-opening of the digital valve and the instant at which this occurs, characterized in that the angular position at an instant at which the pump piston passes through top dead center for the pump is estimated as a function of an angular position of the instant at which the position of start-of-opening of the digital valve appears.

The relationship between the angular positions of top dead center of a high-pressure pump and start-of-opening of the digital valve can be considered to be known from the prior art. However, an estimate of the angular position of top dead center of the high-pressure pump as a function of the position of the start-of-opening of the digital valve has never been employed and doing so is somewhat the reverse of the approach taken in the prior art of estimating the angular position of the start-of-opening of the digital valve.

The invention therefore consists in using the electrical-current profile during the start-up phase once the engine is synchronized. It is therefore possible to determine the position of start-of-opening right from the first few strokes of the pump on the starter motor even before injection is activated. Specifically, once the position of start-of-opening of the digital valve has been located, the angular position of top dead center for the pump, which lies a few degrees before the position of start-of-opening of the digital valve, can be deduced.

Advantageously, the estimate of the angular position on passing through top dead center as a function of the instant at which the position of start-of-opening of the digital valve appears takes account of at least one of the following parameters: the pressures upstream and downstream of the pump, the elastic modulus of the fuel, which is dependent on its temperature and pressure, technical characteristics of the pump such as its dead volume and its swept volume.

Specifically, there is a delay between the instant of passing through top dead center and the position of start-of-opening. This delay is due to the expansion of the fuel and the above-mentioned parameters make it possible to quantify this expansion of the fuel according to the prevailing conditions and the parameters of the fuel.

Advantageously, the pressures upstream and downstream of the pump are measured, the elastic modulus of the fuel is data provided by the fuel supplier, whereas the temperature of the fuel is modeled and its pressure measured and the technical characteristics of the pump are data provided by the pump manufacturer.

Advantageously, the position of start-of-opening of the digital valve is manifested by the appearance of a point of inflection on a curve monitoring the profile of the induced current, the instant of appearance of the point of inflection being considered to be the instant that the position of start-of-opening of the digital valve appears.

Advantageously, the digital valve comprises a shutter returned to an open position by a return element, the digital valve opening as soon as the pressure of the fuel in the chamber drops below the pressure that the return element applies to the shutter of the digital valve.

Advantageously, the digital valve is activated with electrical angular control.

The invention relates to a method for timing a high-pressure fuel injection pump that forms part of a system for injecting fuel into a motor vehicle internal combustion engine, an appearance of top dead center for the pump being synchronized with the engine, characterized in that it implements such a method for estimating an angular position of top dead center for the pump.

What is meant by synchronized is that a top dead center event of the pump is periodically repeated in the engine cycle.

Advantageously, the appearance of a top dead center for the pump is in phase with the appearance of a top dead center of a piston of the engine.

The method for estimating the angular position of top dead center as described hereinabove renders the timing method more reliable and quicker than those of the prior art.

The invention finally relates to a system for injecting fuel into a motor vehicle internal combustion engine comprising a high-pressure fuel injection pump and a control unit, the pump comprising at least one piston moving in a chamber and equipped with a digital control valve for controlling a delivery of fuel which valve is operated by the control unit via an electrical control element connected to the digital valve by an electric circuit, characterized in that it implements such a method for estimating an angular position of top dead center for the pump or such a timing method, the control unit comprising an element for monitoring an induced current induced in the electric circuit as the digital valve opens and for detecting a position of start-of-opening of the digital valve and the instant at which it appears, and an element of calculating the instant at which the pump piston passes top dead center for the pump as a function of the instant at which the position of start-of-opening of the digital valve appears.

Advantageously, the high-pressure pump is fed by a booster pump and supplies a common rail that forms a high-pressure fuel reservoir, the common rail comprising at least one pressure sensor sensing the pressure of the fuel inside it and supplying fuel to a fuel injector for each cylinder of the internal combustion engine, the high-pressure pump being driven by the internal combustion engine.

The solution presented by the present invention requires no additional sensor nor any material modification to the control unit of which the engine control may form a part. It allows very quick detection of the pump timing, even before first injection. The preferred control is executed by an engine control and management unit, but a routine aftersales department check can also be run via a diagnostics connector connected to the control unit, notably to the engine control unit.

BRIEF DESCRIPTION OF THE DRAWINGS

Other features, objects and advantages of the present invention will become apparent upon reading the detailed description that will follow and upon examining the appended drawings, given by way of nonlimiting example and in which.

DETAILED DESCRIPTION OF THE PREFERRED EMBODIMENTS

Figure 1:
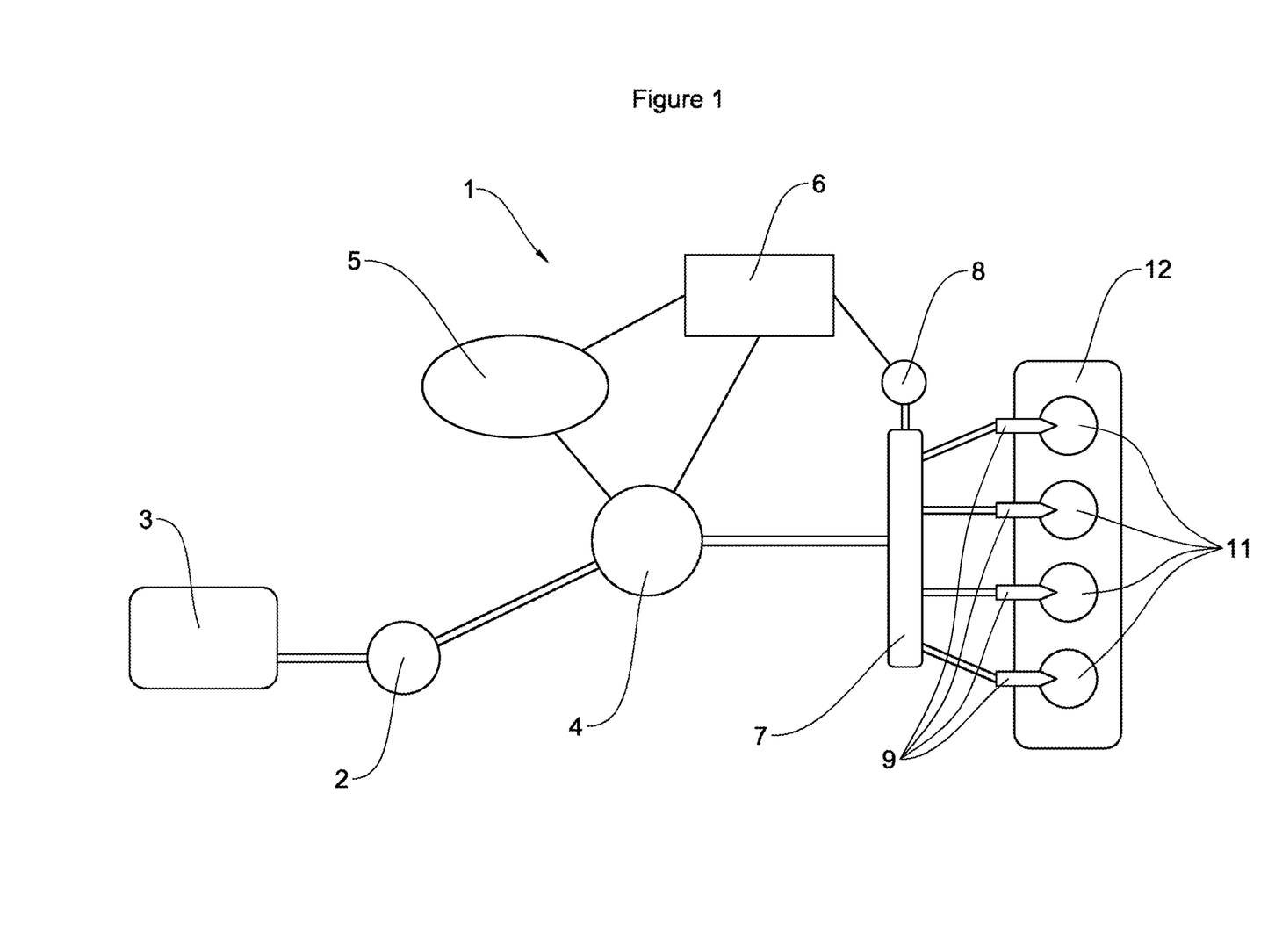
FIG. 1 is a schematic depiction of one view of one embodiment of a high-pressure fuel supply system of an internal combustion engine, this system being equipped with a high-pressure fuel injection pump an angular position of top dead center of which can be estimated according to an estimating method according to the present invention.
Figure 2:
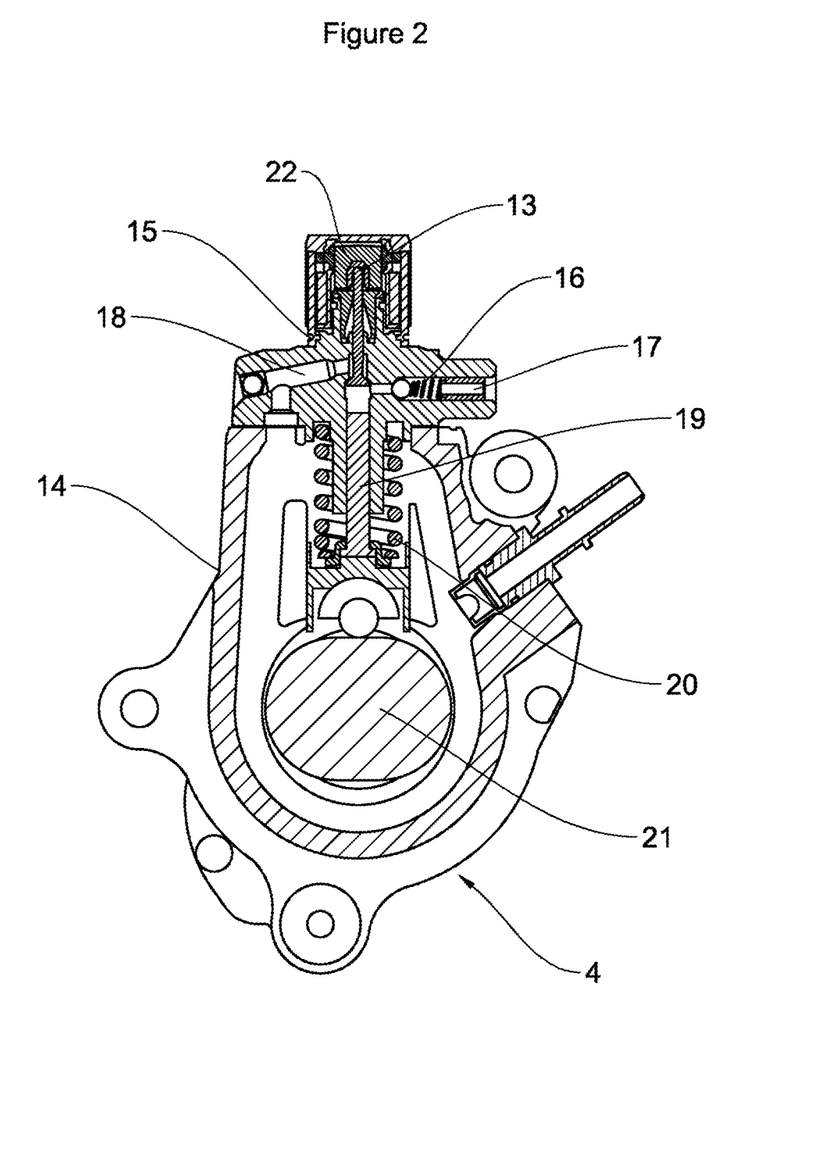
FIG. 2 is a schematic depiction of a view in cross section of a high-pressure fuel injection pump able to implement the method for estimating an angular position of top dead center for the pump according to the present invention.

With more particular reference to FIG. 1, an internal combustion engine high-pressure fuel injection system 1 comprises a booster pump 2 which picks up low-pressure fuel from a low-pressure fuel tank 3, a high-pressure fuel injection pump 4 being fed by the booster pump 2. This high-pressure pump 4 comprises an actuator for a digital valve, which actuator is not depicted in FIG. 1 but is depicted in FIG. 2 and which will be discussed in detail later.

The injection system 1 also comprises a controller 5 for the high-pressure fuel injection pump 4 and, more particularly, for the digital valve actuator and means for activating the high-pressure injection pump 4 by time-based control or angular control using the high-pressure fuel injection pump 4 controller 5 and an engine control unit 6, time-based control being mainly used just after the starting of the motor vehicle.

The injection system 1 also comprises a high-pressure fuel reservoir or common rail 7 fed by the high-pressure fuel injection pump 4, the common rail 7 being provided with means 8 for measuring pressure. Injectors 9 are fed with fuel by the common rail 7 and controlled by the engine control unit 6 to inject fuel into the cylinders 11 of the internal combustion engine 12.

The high-pressure fuel injection pump 4 may be able to be driven in a known way by a drive means, not depicted in FIG. 1, using the internal combustion engine 12, for example using a mechanical transmission linking mechanism of the chain, gears, belt or similar type.

FIG. 2 shows a high-pressure fuel injection pump 4 for the injection system shown in FIG. 1. This pump 4 comprises a pump housing 14. The housing 14 of the pump 4 houses within it a piston 19 returned by a spring 20, the piston 19 being driven by a cam drive mechanism 21.

The pump housing 14 at its upper end has a displacement unit 15 housing a digital valve 13 or DIV valve. The unit 15 comprises a supply and return pipe 18 from and to the booster pump and an outlet pipe 17 leading toward the common rail, this outlet pipe comprising a nonreturn valve 16.

When the digital valve 13 is in the open position, the piston 19 draws fuel from the supply pipe 18 into a cylinder while the nonreturn valve 16 of the outlet pipe 17 is closed.

At the end of the filling phase, the digital valve 13 is still in the open position, the piston 19 drives the fuel in the supply pipe 18 toward the booster pump, namely the low-pressure part of the injection system, while the nonreturn outlet valve 16 of the outlet pipe 17 remains closed. That allows excess fuel to be carried back into the low-pressure part of the injection system.

Next, the digital valve 13 is electrically commanded to close, the supply pipe 18 then being closed, the piston 19 drives the fuel in the outlet pipe 17 toward the common rail, namely toward the high-pressure part of the injection system, the nonreturn valve 16 of the outlet pipe 17 then being open.

Figure 3:
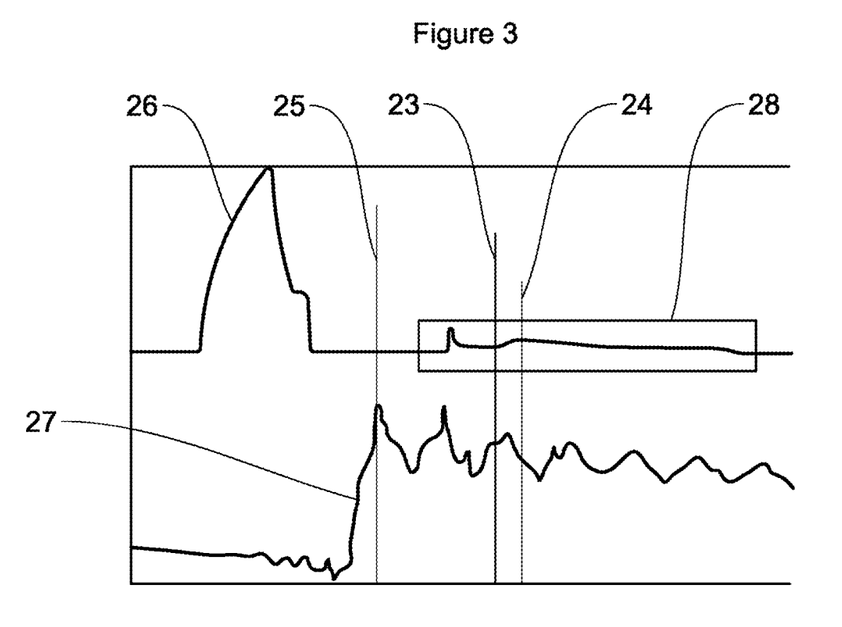
FIG. 3 shows two curves, of the current at the digital valve and of the pressure in the common rail of the high-pressure part of the injection system, respectively, identifying an angular position of top dead center for the pump and of start-of-opening of the digital valve, detection of an angular position of top dead center for the pump according to the position of start-of-opening of the digital valve being implemented according to the estimating method according to the present invention.

FIG. 3 illustrates two curves as a function of time. The first curve 26 illustrates the current supplied to the digital valve and the second curve 27 illustrates the pressure in the common rail, namely in the high-pressure part of the injection system. The framed part 28 represents a window for measuring the position of start-of-opening 23 of the digital valve and a wide open position 24 of this digital valve, showing the fluctuations in current as the digital valve opens.

Pump top dead center 25 can be recognised at the end of the increase in pressure in the common rail, whereas the start-of-opening of the digital valve can be recognised by a point of inflection in the fluctuating current curve.

As mentioned previously, in order to be controlled with precision, the timing of a high-pressure pump that forms part of a high-pressure fuel injection system needs to be precisely known. The timing is generally achieved by mechanical means in association with the engine, but uncertainties associated with the tolerances on all these components still remain. It is therefore necessary to estimate an angular position of top dead center for the the high-pressure pump quickly and precisely.

The present invention makes it possible to perform more rapid adaptation of the timing right from the first few revolutions of the engine by using a back check on the current induced by the digital valve that controls the delivery of fuel to the high-pressure part of the injection system. This is achieved by detecting the start-of-opening of the digital valve and deducing the position of an angular position of top dead center for the pump right from the first few revolutions of the engine.

Figure 4:
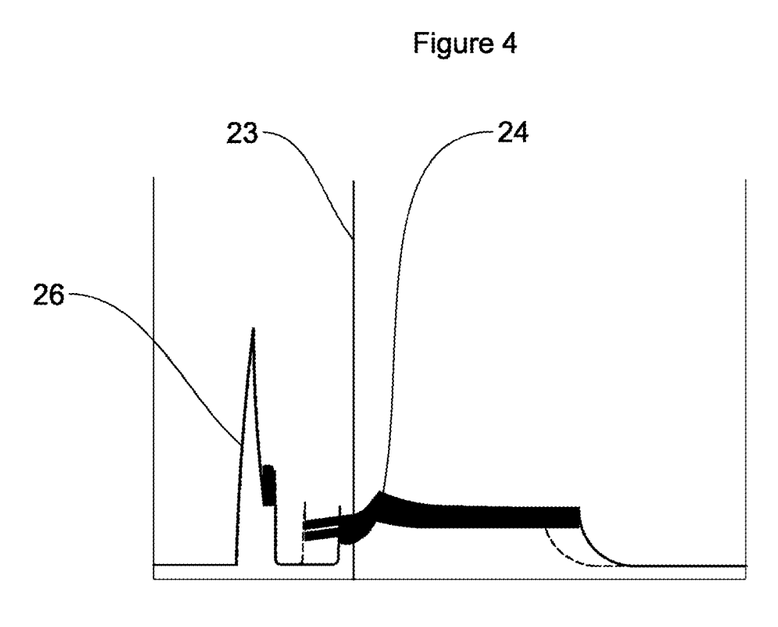
FIG. 4 shows two electrical-current curves, respectively relating to one of two digital valves exhibiting a phase shift between them, the two curves having coinciding positions of start-of-opening, the two digital valves having the same angular positions for top dead center estimated according to the method according to the present invention.

FIG. 4 shows two more or less superposed curbs of current supplied respectively to a correctly-timed digital valve and to a digital valve the timing of which is phase-shifted. FIG. 4 therefore makes it possible to establish a comparison between the current supplied to a digital valve of a high-pressure pump that is correctly timed and that of a pump the reference angle of which is skewed, in this figure by 10°, this figure being nonlimiting.

During this comparison, it is found that the current profile generated by the control unit is different. By contrast, the instant of start-of-opening 23 of the digital valve that is correctly timed or that is phase-shifted lies at the same point in both instances because it corresponds to a physical phenomenon: the reopening of the digital valve as the piston re-descends just after top dead center for the pump.

The position of start-of-opening 23 of the digital valve is therefore independent of the reference angle of the digital valve. This then makes it possible reliably and for the one same type of digital valve to estimate an angular position of top dead center for the high-pressure pump housing it, independently of the phase shifting of this digital valve and whatever its programmed angle.

With reference to all of the figures, the present invention relates to a method for estimating an angular position of top dead center 25 for a high-pressure fuel injection pump 4 that forms part of a system 1 for injecting fuel into a motor vehicle internal combustion engine 12. The pump 4 comprises at least one piston 19 moving in a chamber of the pump 4 between a top dead center 25 for which a volume of the chamber is at its smallest and a bottom dead center for which the volume of the chamber is at its greatest.

Such a pump 4 is equipped with a digital control valve 13 for controlling the quantity of fuel, this valve being commanded electrically between an open position in which a high-pressure part of the injection system 1 is not supplied with fuel and a closed position in which the high-pressure part of the injection system 1 is supplied with the digital valve 13 then being in a fully closed position.

In order to achieve this, an electrical current is applied to the digital valve 13 as it closes then removed in order to open the digital valve 13, a movement of the digital valve 13 between its closed position and its open position creating an induced current which, when its profile over time is monitored, makes it possible to detect a position of start-of-opening 23 of the digital valve 13 and the instant at which this occurs.

According to the invention, an angular position at an instant at which the piston 19 of the pump 4 passes through top dead center 25 for the pump 4 is estimated as a function of an angular position of the instant at which the position of start-of-opening 23 of the digital valve 13 appears.

The engine control unit 6 applies a current to the digital valve 13 in order to close it at the moment between bottom dead center and top dead center 25 of the pump 4 during the phase for which it is desired to compress the fuel in the pump 4. This current is removed shortly before top dead center 25, as shown in FIGS. 3 and 4. The compression of the fuel keeps the digital valve 13 closed.

Once the angular position of top dead center 25 of the pump 4 has been passed, the digital valve 13 will open naturally as soon as the pressure in the cylinder of the pump 4 drops below the force applied by a return element 22 of the digital valve 13.

In particular, during the first few strokes of the piston 19, as the pressure in the common rail 7 is low, the offset between the instants of crossing top dead center 25 and of start-of-opening 23 of the digital valve 13 is very small also, and so the uncertainty is correspondingly smaller making this a preferred instant at which to estimate an angular position of top dead center 25.

If a current of predetermined strength is applied, it is possible, via the current induced by the movement of the digital valve 13, to determine the moment at which the digital valve 13 will begin to open, which means to say the start-of-opening 23 of the digital valve 13 and the wide open position 24 of the digital valve 13.

The estimate of an angular position of the instant of passing through top dead center 25 as a function of an angular position of the instant at which the position of start-of-opening 23 of the digital valve 13 appears may take account of at least one of the following parameters: the pressures upstream and downstream of the pump 4, the elastic modulus of the fuel, which is dependent on its temperature and pressure, technical characteristics of the pump 4 such as its dead volume and its swept volume.

The pressures upstream and downstream of the pump 4 may be measured respectively in the booster pump 2 and in the common rail 7. The elastic modulus of the fuel is data provided by the fuel supplier, whereas the temperature of the fuel can be modeled and its pressure measured. The technical characteristics of the pump 4 are known as these are data provided by the manufacturer of the pump 4.

As can be seen in FIGS. 3 and 4, making reference to all of the figures for the numerical references, the position of start-of-opening 23 of the digital valve 13 may be manifested by the appearance of a point of inflection in the curve monitoring the profile of the induced current. It is this instant of appearance of the point of inflection that is considered to be the instant of appearance of the position of start-of-opening 23 of the digital valve 13. The induced current passes through a point of inflection, for example dropping significantly as it passes through a point of inflection, signaling the position of start-of-opening 23, then rising again to pass through a maximum which signals the wide open position 24 of the digital valve 13.

The digital valve 13 may comprise a shutter 30 returned to the open position by a return element or spring 22. Simplistically, the digital valve 13 or, more specifically, the shutter 30, opens as soon as the pressure of the fuel in the chamber drops below the pressure exerted by the return element on the shutter 30 of the digital valve 13. This is what causes a delay between the angular positions of top dead center 25 and of the position of start-of-opening 23 of the digital valve.

Figure 5:
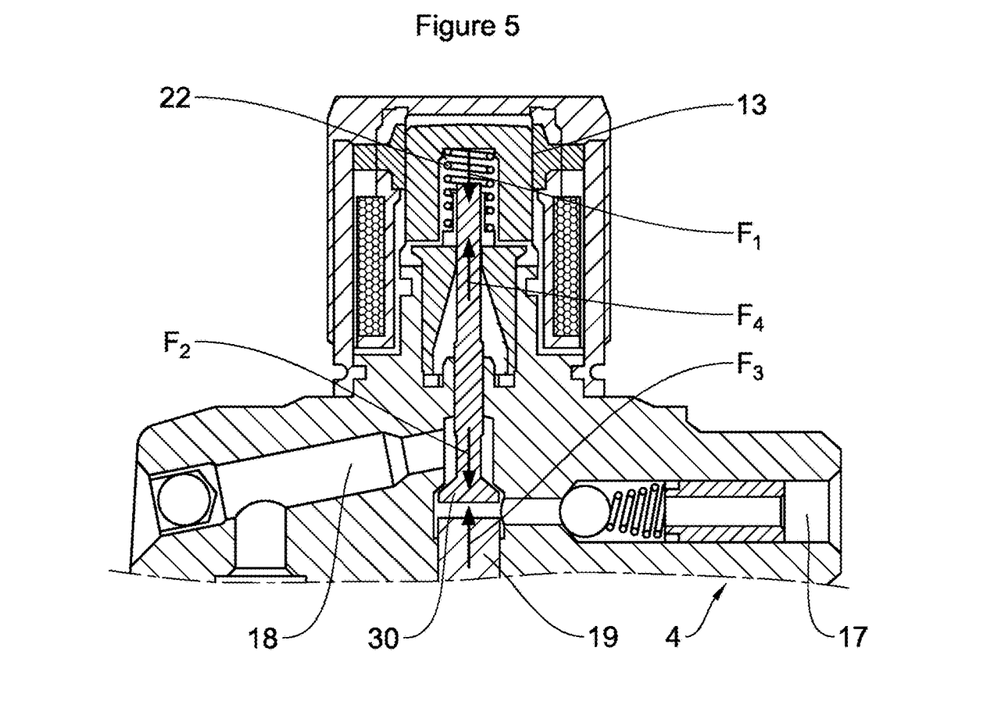
FIG. 5 shows an enlargement of the pump of FIG. 2 considered at the digital valve, showing the balance of forces on this valve, FIGS. 6A and 6B correspond to two schematic depictions of a view in cross section of the high-pressure fuel injection pump according to FIG. 2, enlarged in the region of the digital valve, so as respectively to depict two particular operating points of the pump, accompanied by the corresponding synchronized curves of the position of the piston of the pump and of the electrical-current signal for the applied current and the current induced by the movement of the digital valve, for each operating point.

More specifically, as depicted in FIG. 5 in an enlargement in order to show the structural details of one example of a digital valve 13, the shutter 30 of the digital valve 13 is subjected to a set of four forces F1, F2, F3, and F4, as follows:

F1: force applied to the shutter 30 by the spring 22,
F2: force applied to the shutter 30 by the low-pressure fuel,
F3: force applied to the shutter 30 by the high-pressure fuel,
F4: electromagnetic force applied to the shutter 30 by the digital valve actuator.

The forces F1, F2, F3, and F4 have the following effects on the shutter 30: the forces F1 and F2 seek to open the shutter 30, and the forces F3 and F4 keep it closed. The digital valve 13 therefore opens as soon as the set of forces present are such that F1+F2>F3+F4.

Definition of the forces:

$$F1 = K*(x-x0)$$

Where:
K: spring rate (constant)
x: compressed length of the spring
x0: free length of the spring The force F1, which is therefore equal to the product of the spring rate constant times the difference between the free and compressed lengths of the spring 22, is constant and known when the digital valve 13 is closed.

$$F2 = \text{supply pressure} * \text{contact area of the valve shutter}$$

Where:
the supply pressure is the measured supply pressure of the low-pressure fuel, and
the contact area of the valve shutter is the area via which the shutter 30 makes contact with its valve 13 seat, which is known by construction.

The force F2, which is therefore equal to the product of the measured low-pressure fuel supply pressure times the area of contact of the shutter of the digital valve on its seat, is constant and known when the digital valve 13 is closed.

$$F3 = \text{pressure in the cylinder} * \text{area of contact of the shutter}$$

Where:
The pressure in the cylinder is the pressure of the fuel in the cylinder of the pump 4, and
The contact area of the shutter is, as defined above, the area via which the shutter of the digital valve makes contact with its seat, which is known by construction.

As regards the force F3, the pressure in the cylinder starts from a maximum which is the pressure in the common rail when the piston 19 is at top dead center, and decreases as the piston descends.

The force F4 is characterized by the current passing through the digital valve actuator, for example the coil of a solenoid acting on the shutter 30. This current is measured by the fuel injection system 1 and is known.

Figure 6A:
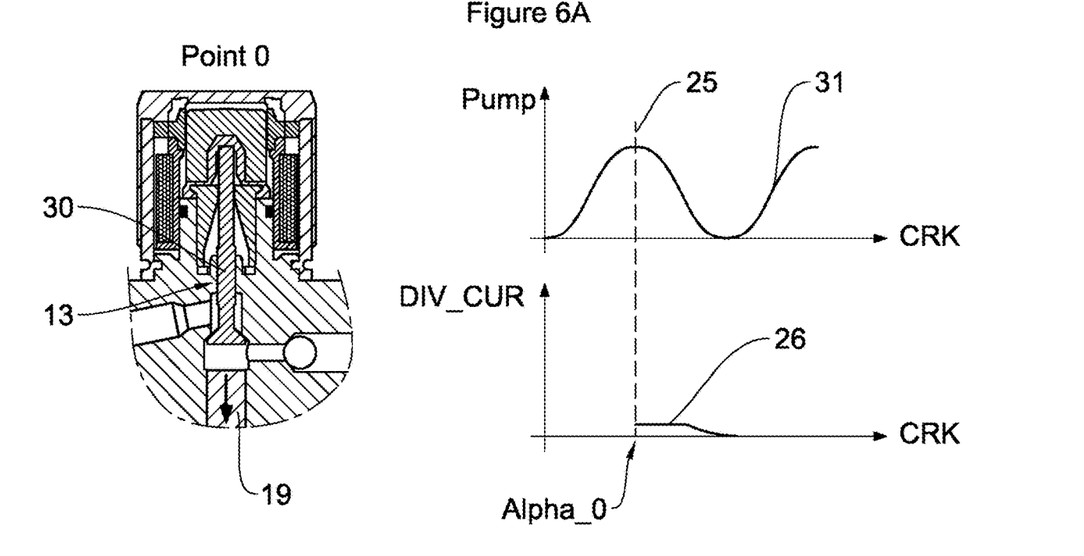

FIG. 6A depicts the digital valve 13 with the piston 19 of the pump 4 depicted at its operational top dead center, referenced point 0. FIG. 6A also depicts two diagrams with the abscissa axis indicating the position of the crankshaft "CRK" and the ordinate axis indicating, in the top diagram, the travel of the pump piston "Pump", and, in the bottom diagram, the current "DIV_CUR" applied to and induced by the valve 13. The abscissa axis of the two diagrams are synchronized. In the top diagram, curve 31 shows the position of the piston 19 of the pump as a function of the position of the crankshaft, and in the bottom diagram, the signal 26 of the current applied to and induced by the valve 13.

Figure 6B:
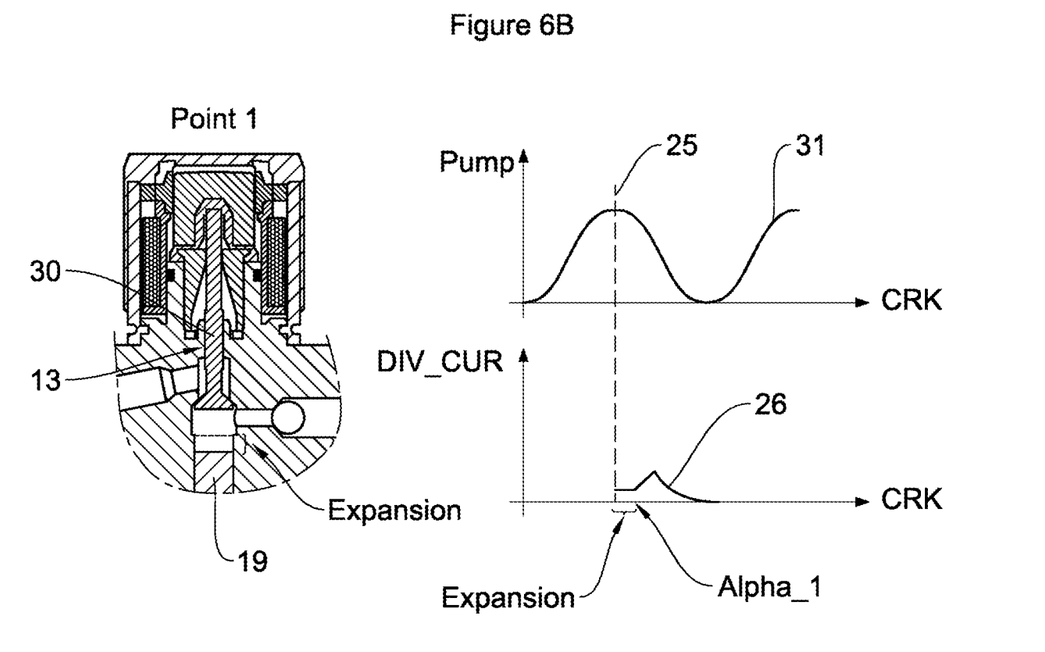

FIG. 6B depicts the digital valve 13 with the piston 19 of the pump 4 depicted at its operational position of start-of-opening of the digital valve 13, referenced point 1. FIG. 6B also depicts two diagrams with the abscissa axis indicating the position of the crankshaft "CRK" and the ordinate axis indicating, in the top diagram, the travel of the pump piston "Pump", and, in the bottom diagram, the current "DIV_CUR" applied to and induced by the valve 13. The abscissa axis of the two diagrams are synchronized. In the top diagram, curve 31 shows the position of the piston 19 of the pump as a function of the position of the crankshaft, and in the bottom diagram, the signal 26 of the current applied to and induced by the valve 13. FIG. 6B also shows the expansion of the piston 19 of the pump, between the two respective positions of the piston of FIGS. 6A and 6B, which is referenced by the term "Expansion" in FIG. 6B.

Therefore let the two particular operating points, according to FIGS. 6A and 6B, be:

Point 0: top dead center 25 or TDC 25 of the piston 19, characterized by a pressure P0 equal to the pressure in the common rail, the corresponding volume V0 of the chamber of the pump 4 being equal to the dead volume of the pump 4, and the angular position of top dead center 25 for the pump 4, referenced Alpha_0 in FIG. 6A, which is the unknown.

Point 1: position of start-of-opening of the digital valve 13, characterized by a pressure P1, the corresponding volume V1 of the pump 4 chamber and the angular position of start-of-opening 23 of the digital valve 13 referenced Alpha_1 in FIG. 6B.

The pressure P1 is determined at the point 1 from the following balance of forces: F3=F1+F2−F4. The law governing the elasticity of fuels enables V1 to be calculated using the elastic modulus of the fuel and the pressures P0 and P1, as follows.

Let Point 0 (TDC) be defined by:
P0=pressure of the common rail 7,
V0=dead volume, known by design,
Alpha_0=TDC position=unknown Let Point 1 (point of start-of-opening of the valve) be defined by P1, V1, and Alpha_1=known position, measured by the system.

At the Point 1, there is the following balance of forces: F3=F1+F2−F4; since the forces F1, F2 and F4 are known, F3 is determined in the knowledge that since F4 is dependent on the current, it will be characterized by measurements taken by the fuel injection system 1:

$$F3 = P1 * \text{area of contact of the valve}.$$

There is determined:

$$P1 = (F1+F2-F4)/\text{area of contact of the valve}.$$

Next, V1 is determined using the fuel elasticity equation:

$$dP = -E * \left(\frac{dV}{V}\right)$$

Where:
dP: variation in pressure, in Pa,
E: cubic elastic modulus, in Pa,
dV: variation in volume,
V: volume.

This gives the following relationship: dP=−E*dV/V0, namely (P0-P1)=−E*(V0-V1)/V0, where the elastic modulus E is a characteristic of the fuel dependent on its pressure and temperature. The volume V1=V0+(P0-P1)*V0/E is determined.

Furthermore, V1 is equal to V0 increased by the volume freed by the piston 19, namely the volume equal to the surface area of the piston 19 multiplied by the stroke of the piston 19. Because the surface area of the piston 19 is known, the stroke of the piston 19 is deduced as follows:

$$\text{Piston stroke} = (V1-V0)/\text{piston surface area}$$

Since the cam profile (the lift of the piston 19 as a function of the angle) is known, the stroke of the piston 19 can be expressed in terms of the difference (alpha_1-alpha_0). And since Alpha_1 is measured by the system as being the angle at which the inflection in the current is seen, it can be used to deduce Alpha_0 which is the sought-after TDC of the pump.

The digital valve 13 can be activated with electric angular control. Electrical angular control requires synchronizing the pump 4 to the internal combustion engine 12. The angular control may follow a crank angle of the internal combustion engine 12.

Angular control of the high-pressure fuel injection pump 4 may be achieved in the known way using a plurality of electrical pulses, for example of what is known as the "Peak and Hold", over a determined number of segments.

The determination of the top dead center 25 for the pump 4 is used for setting the timing of the high-pressure pump 4 with respect to the internal combustion engine 12, advantageously although not exclusively, by correspondence between top dead center 25 of the pump 4 and top dead center of one piston of the engine 12.

The invention therefore relates to a method for setting the timing of a high-pressure fuel injection pump 4 that forms part of a system 1 for injecting fuel into a motor vehicle internal combustion engine 12. In this timing method, an appearance of top dead center 25 for the pump 4 is synchronous with the engine 12 and advantageously in phase with the appearance of a top dead center of a piston of the engine 12. This method of setting the pump timing uses a method for estimating an angular position of top dead center 25 for the pump 4 as described hereinabove.

The invention finally relates to a system 1 for injecting fuel into a motor vehicle internal combustion engine 12, comprising a high-pressure fuel injection pump 4 and a control unit 5, 6. The control unit may comprise a controller 5 specific to the high-pressure fuel injection pump 4 and an engine control unit 6 with broader attributions regarding the operation of the combustion engine 12 and notably the injection of fuel into the engine 12.

The pump 4 comprises at least one piston 19 moving in a chamber and is equipped with a digital valve 13 for controlling a delivery of fuel this valve being operated by the control unit 5, 6 via an electric control element connected to the digital valve 13 by an electric circuit.

According to the invention, the injection system 1 employs a method for estimating an angular position of top dead center 25 for the pump 4 or a timing method, each as described hereinabove. The control unit 5, 6, and more particularly the controller 5 specific to the pump, comprises an element for monitoring a current induced in the electric circuit as the digital valve 13 opens and for detecting a position of start-of-opening 23 of the digital valve 13 and the instant at which it appears.

The control unit 5, 6 also comprises an element for calculating the instant at which the piston 19 of the pump 4 passes through top dead center 25 for the pump 4, as a function of the instant at which the position of start-of-opening 23 of the digital valve 13 appears.

The invention claimed is:

1. A method for estimating an angular position of top dead center (25) for a high-pressure fuel injection pump (4) that forms part of an injection system (1) for injecting fuel into a motor vehicle internal combustion engine (12),
the pump (4) having at least one piston (19) that moves in a chamber of the pump (4) between the top dead center (25) at which a volume of the chamber is smallest and a bottom dead center at which the volume of the chamber is greatest, the pump (4) being equipped with a digital control valve (13) for controlling a quantity of fuel delivery, said digital control valve (13) configured to be commanded electrically to be actuated between an open position in which a high-pressure part of the injection system is not supplied with fuel and a closed position in which the high-pressure part of the injection system is supplied with fuel with the digital control valve (13) then being in a fully closed position, an electrical current applied to the digital control valve (13) as the digital control valve (13) closes then being removed in order to open the digital control valve (13), a movement of the digital control valve (13) toward the open position creating an induced current which, when a profile over time is monitored, facilitates a detection of a position of a start-of-opening (23) of the digital valve (13) and an instant at which said start-of-opening (23) occurs, the method comprising:
estimating an angular position at an instant at which the piston (19) of the pump (4) passes through the top dead center (25) as a function of an angular position of the pump (4) at the instant at which said start-of-opening (23) of the digital control valve (13) occurs,
the estimated angular position at the instant of the pump (4) passing through the top dead center (25) further taking account of at least one of the following parameters:
pressures upstream and downstream of the pump (4),
an elastic modulus of the fuel, being dependent on temperature and pressure of the fuel, and
technical characteristics of the pump (4).

2. The method as claimed in claim 1, wherein the pressures upstream and downstream of the pump (4) are measured, the elastic modulus of the fuel is data provided by the fuel supplier, the temperature of the fuel is modeled, a pressure of the fuel is measured, and the technical characteristics of the pump (4) are data provided by a manufacturer of the pump (4).

3. The method as claimed in claim 2, wherein the position of said start-of-opening (23) of the digital control valve (13) is manifested by an appearance of a point of inflection on a curve monitoring the profile of the induced current, an instant of appearance of the point of inflection being the instant at which said start-of-opening (23) occurs.

4. The method as claimed in claim 2, wherein the digital control valve (13) comprises a shutter configured to be returned to an open position by a return element (22), the digital valve (13) opening as soon as a pressure of the fuel in the chamber drops below a pressure that the return element applies to the shutter.

5. The method as claimed in claim 2, wherein the digital control valve (13) is activated using electric angular control.

6. A system (1) for injecting fuel into a motor vehicle internal combustion engine (12), comprising:
a high-pressure fuel injection pump (4) and a control unit (5, 6),
the pump (4) comprising at least one piston (19) that moves in a chamber, and equipped with a digital control valve (13) for controlling a delivery of fuel, the digital control valve operated by the control unit (5, 6) via an electrical control element connected to the digital control valve (13) by an electric circuit,
wherein the control unit implements the method for estimating the angular position of the top dead center (25) for the high-pressure fuel injection pump (4) as claimed in claim 2, the control unit (5, 6) comprising an element for monitoring an induced current induced in the electric circuit as the digital control valve (13) opens, and for detecting a position of said start-of-opening (23) of the digital control valve (13) and the instant at which said start-of-opening (23) occurs, and also comprising an element that calculates the instant at which the piston (19) of the pump (4) passes the top dead center (25) as a function of the instant at which said start-of-opening (23) occurs.

7. The method as claimed in claim 1, wherein the position of said start-of-opening (23) of the digital control valve (13) is manifested by an appearance of a point of inflection on a curve monitoring the profile of the induced current, an instant of appearance of the point of inflection being the instant at which said start-of-opening (23) occurs.

8. The method as claimed in claim 7, wherein the digital control valve (13) comprises a shutter configured to be returned to an open position by a return element (22), the digital valve (13) opening as soon as a pressure of the fuel in the chamber drops below a pressure that the return element applies to the shutter.

9. The method as claimed in claim 7, wherein the digital control valve (13) is activated using electric angular control.

10. A system (1) for injecting fuel into a motor vehicle internal combustion engine (12), comprising:
  a high-pressure fuel injection pump (4) and a control unit (5, 6),
  the pump (4) comprising at least one piston (19) that moves in a chamber, and equipped with a digital control valve (13) for controlling a delivery of fuel, the digital control valve operated by the control unit (5, 6) via an electrical control element connected to the digital control valve (13) by an electric circuit,
  wherein the control unit implements the method for estimating the angular position of the top dead center (25) for the high-pressure fuel injection pump (4) as claimed in claim 7,
  the control unit (5, 6) comprising an element for monitoring an induced current induced in the electric circuit as the digital control valve (13) opens, and for detecting a position of said start-of-opening (23) of the digital control valve (13) and the instant at which said start-of-opening (23) occurs, and also comprising an element that calculates the instant at which the piston (19) of the pump (4) passes the top dead center (25) as a function of the instant at which said start-of-opening (23) occurs.

11. The method as claimed in claim 1, wherein the digital control valve (13) comprises a shutter configured to be returned to an open position by a return element (22), the digital valve (13) opening as soon as a pressure of the fuel in the chamber drops below a pressure that the return element applies to the shutter.

12. The method as claimed in claim 11, wherein the digital control valve (13) is activated using electric angular control.

13. A system (1) for injecting fuel into a motor vehicle internal combustion engine (12), comprising:
  a high-pressure fuel injection pump (4) and a control unit (5, 6),
  the pump (4) comprising at least one piston (19) that moves in a chamber, and equipped with a digital control valve (13) for controlling a delivery of fuel, the digital control valve operated by the control unit (5, 6) via an electrical control element connected to the digital control valve (13) by an electric circuit,
  wherein the control unit implements the method for estimating the angular position of the top dead center (25) for the high-pressure fuel injection pump (4) as claimed in claim 11,
  the control unit (5, 6) comprising an element for monitoring an induced current induced in the electric circuit as the digital control valve (13) opens, and for detecting a position of said start-of-opening (23) of the digital control valve (13) and the instant at which said start-of-opening (23) occurs, and also comprising an element that calculates the instant at which the piston (19) of the pump (4) passes the top dead center (25) as a function of the instant at which said start-of-opening (23) occurs.

14. The method as claimed in claim 1, wherein the digital control valve (13) is activated using electric angular control.

15. A system (1) for injecting fuel into a motor vehicle internal combustion engine (12), comprising:
  a high-pressure fuel injection pump (4) and a control unit (5, 6),
  the pump (4) comprising at least one piston (19) that moves in a chamber, and equipped with a digital control valve (13) for controlling a delivery of fuel, the digital control valve operated by the control unit (5, 6) via an electrical control element connected to the digital control valve (13) by an electric circuit,
  wherein the control unit implements the method for estimating the angular position of the top dead center (25) for the high-pressure fuel injection pump (4) as claimed in claim 14,
  the control unit (5, 6) comprising an element for monitoring an induced current induced in the electric circuit as the digital control valve (13) opens, and for detecting a position of said start-of-opening (23) of the digital control valve (13) and the instant at which said start-of-opening (23) occurs, and also comprising an element that calculates the instant at which the piston (19) of the pump (4) passes the top dead center (25) as a function of the instant at which said start-of-opening (23) occurs.

16. A method for timing a high-pressure fuel injection pump (4) that forms part of a system (1) for injecting fuel into a motor vehicle internal combustion engine (12), an occurrence of top dead center (25) of the high-pressure fuel injection pump (4) being synchronized with the engine (12), wherein the method implements the method for estimating the angular position of the top dead center (25) for the high-pressure fuel injection pump (4) as claimed in claim 1.

17. The timing method as claimed in claim 16, wherein the instant of the pump (4) passing through the top dead center (25) is in phase with top dead center of a piston of the engine.

18. A system (1) for injecting fuel into a motor vehicle internal combustion engine (12), comprising:
  a high-pressure fuel injection pump (4) and a control unit (5, 6),
  the pump (4) comprising at least one piston (19) that moves in a chamber, and equipped with a digital control valve (13) for controlling a delivery of fuel, the digital control valve operated by the control unit (5, 6) via an electrical control element connected to the digital control valve (13) by an electric circuit,
  wherein the control unit implements the method for estimating the angular position of the top dead center (25) for the high-pressure fuel injection pump (4) as claimed in claim 16, the control unit (5, 6) comprising an element for monitoring an induced current induced in the electric circuit as the digital control valve (13) opens, and for detecting a position of said start-of-opening (23) of the digital control valve (13) and the instant at which said start-of-opening (23) occurs, and also comprising an element that calculates the instant at which the piston (19) of the pump (4) passes the top dead center (25) as a function of the instant at which said start-of-opening (23) occurs.

19. A system (1) for injecting fuel into a motor vehicle internal combustion engine (12), comprising:
   a high-pressure fuel injection pump (4) and a control unit (5, 6),
   the pump (4) comprising at least one piston (19) that moves in a chamber, and equipped with a digital control valve (13) for controlling a delivery of fuel, the digital control valve operated by the control unit (5, 6) via an electrical control element connected to the digital control valve (13) by an electric circuit,
   wherein the control unit implements the method for estimating the angular position of the top dead center (25) for the high-pressure fuel injection pump (4) as claimed in claim 1,
   the control unit (5, 6) comprising an element for monitoring an induced current induced in the electric circuit as the digital control valve (13) opens, and for detecting a position of said start-of-opening (23) of the digital control valve (13) and the instant at which said start-of-opening (23) occurs, and also comprising an element that calculates the instant at which the piston (19) of the pump (4) passes the top dead center (25) as a function of the instant at which said start-of-opening (23) occurs.

20. The injection system (1) as claimed in claim 19, wherein the pump (4) is fed by a booster pump (2) and supplies a common rail (7) that forms a high-pressure fuel reservoir, the common rail (7) comprising at least one pressure sensor that senses a pressure of fuel inside the common rail (7) and supplies fuel to a fuel injector for each cylinder of the internal combustion engine (12), the pump (4) being driven by the internal combustion engine (12).

\* \* \* \* \*